United States Patent Office 3,450,803
Patented June 17, 1969

3,450,803
PREPARATION OF POLY (HYDROXYPROPYL) POLYPHOSPHATES
Alec Odinak, New Haven, and Edward J. Thompson, Watertown, Conn., assignors to The Upjohn Company, Kalamazoo, Mich., a corporation of Delaware
No Drawing. Filed Apr. 4, 1966, Ser. No. 539,659
Int. Cl. C07f 9/08; C08g 33/16
U.S. Cl. 260—978
13 Claims

ABSTRACT OF THE DISCLOSURE

The hydroxyalkoxylation of phosphoric acids which have a $P_2O_5$ content of at least 78% (normally two viscous to alkoxylate without the use of an inert solvent) is effected by reaction with alkylene oxides using as reaction medium a previously prepared batch of desired end product. Semicontinuous operation is described in which, after reaction is complete in a first alkoxylation, part of the batch is removed, more starting phosphoric acid is added to the remainder of the batch, alkylene oxide is added, and the cycle of operations is repeated.

---

This invention relates to the preparation of hydroxyalkyl phosphates and is more particularly concerned with an improved process for the preparation of adducts of alkylene oxides with phosphoric acid having a $P_2O_5$ content greater than about 72.4%.

The preparation of adducts of alkylene oxides with mono- and polyphosphoric acids is well known in the art; see, for example, U.S. Patents 2,372,244, 3,094,549, and 3,099,676. The hydroxyalkyl phosphates and polyphosphates so prepared are useful as intermediates in the synthesis of a variety of compounds. For example, they can be reacted with polyisocyanates in accordance with procedures conventional in the art (see, for example, Saunders et al., Polyurethanes, Chemistry and Technology, Part II, Interscience Publishers, New York, 1964) to prepare both cellular and non-cellular polyurethanes. The use of the hydroxyalkyl mono- and polyphosphates in this manner imparts improved flame resistance to the polyurethanes so prepared. The hydroxyalkyl mono- and polyphosphates can also be reacted with polyepoxide resins in the preparation of castings, laminates, molded articles and the like as is described in U.S. Patent 3,099,676, supra.

Generally speaking the synthesis of the hydroxyalkyl mono- and polyphosphates is carried out by direct reaction of the appropriate alkylene oxide and the mono- or polyphosphoric acids. Such a procedure is reasonably convenient in the case of the mono acid, i.e., orthophosphoric acid itself, but becomes increasingly difficult in the case of the various commercially available polyphosphoric acids, as discussed below, in which increasing complexity of the acid is accompanied by increasing viscosity.

The viscosity problem can be overcome by the use of an inert organic solvent diluent such as dioxane, diethyl ether, acetonitrile, alkyl phosphates and the like as described in U.S. Patent 3,094,549. Such an expedient is undesirable because of the added cost of operation due to the need to recover the solvent and also because of the inevitable loss of relatively expensive solvent. The overall cost of preparation of the hydroxyalkyl polyphosphates is a critical factor in their marketability, particularly where they are to be used as intermediates in the preparation of polyurethanes. The added cost of using a solvent can make the difference between economic and uneconomic operation.

It is an object of this invention to provide a method of successfully reacting an alkylene oxide with a polyphosphoric acid having a viscosity such that it precludes direct reaction in the absence of a catalyst. It is a further object of the invention to prepare hydroxyalkyl polyphosphates having a higher ratio of phosphorus content to hydroxy equivalent than was hitherto possible without the use of relatively expensive inert organic diluents.

The novel process of the invention consists of an improved process for the preparation of poly(hydroxyalkyl) polyphosphate by reaction of an alkylene oxide with a phosphoric acid having a calculated $P_2O_5$ content of at least about 78% by weight wherein the improvement comprises admixing said phosphoric acid starting material with a major proportion of desired poly(hydroxyalkyl) polyphosphate end product obtained in a previous batch of said end product and reacting the mixture so obtained with the appropriate alkylene oxide.

The various polyphosphoric acids which are available are generally regarded as being mixtures of orthophosphoric acid (corresponding to the formula $H_3PO_4$), pyrophosphoric acid $(H_4P_2O_7)$, tripolyphosphoric acid $(H_5P_3O_{10})$, and the like "condensed" acids theoretically derived by condensation (involving water elimination and the formation of anhydride linkages) of two or more molecules of orthophosphoric acid. The composition of the above polyphosphoric acids is generally expressed by regarding said acids as mixtures of water ($H_2O$) and phosphorus pentoxide ($P_2O_5$) in varying proportions. The composition of any particular acid is generally stated in terms of percentage by weight of $P_2O_5$ therein; see, Van Wazer, Phosphorus and Its Compounds, vol. I, pages 747–9, Interscience, New York 1958. Thus, pure orthophosphoric acid corresponds theoretically to a mixture of $H_2O$ and $P_2O_5$ in the ratio of 3 moles of water to 1 mole of $P_2O_5$ and is expressed as phosphoric acid containing 72.4% $P_2O_5$. Similarly pyrophosphoric acid corresponds to a mixture of 2 moles of water to 1 mole of $P_2O_5$ and is expressed as phosphoric acid containing 79.6% $P_2O_5$.

An alternative method of designating the composition of polyphosphoric acids is in terms of their theoretical content of orthophosphoric acid. For example, phosphoric acid containing 72.4% $P_2O_5$ is referred to alternatively as 100% phosphoric acid meaning that its composition corresponds theoretically to pure orthophosphoric acid. Phosphoric acid analysing as 79.6% $P_2O_5$ is alternatively designated as 110% phosphoric acid; similarly 82.5% $P_2O_5$ acid is designated 114% phosphoric acid, 83.98% $P_2O_5$ is designated 116% phosphoric acid, and so on.

It is found that phosphoric acid having a $P_2O_5$ content up to about 78% $P_2O_5$, i.e., about 106% phosphoric acid, has a viscosity sufficiently low to permit adequate mixing of the reaction mixture of such acids with alkylene oxides. Such mixing is necessary in order to avoid localized overheating of the reaction mixtures with consequent darkening of color and production of non-homogeneous products.

When the starting polyphosphoric acid has a $P_2O_5$ content higher than the above limits the viscosity thereof is such that the necessary agitation of the alkoxylation reaction mixture cannot be carried out in a satisfactory manner. We have now found that this difficulty can be overcome satisfactorily and without resort to the use of relatively expensive inert organic diluents by employing as reaction medium a portion of a previously prepared batch of the desired end product i.e. the hydroxyalkoxylated polyphosphoric acid. As will be obvious to one skilled in the art, such a procedure has the additional advantage of being adapted to semicontinuous production of the desired end product. Thus part of each batch of hydroxyalkylated polyphosphoric acid is retained and processed through packaging and like steps as finished product, and the remainder of the batch is employed as reaction medium for the succeeding batch. The latter, on completion of the alkoxylation, is again divided, one portion being retained as finished product and the other portion being employed as reaction medium for the succeeding batch. This process of semicontinuous operation can be repeated indefinitely.

In carrying out the improved process of the invention the polyphosphoric acid which is to be alkoxylated is admixed with a sufficient amount of a previously prepared batch of hydroxyalkylated polyphosphoric acid to produce a mixture which can be stirred efficiently in conventionally employed equipment. In general it is found that the upper limit of viscosity beyond which it is not possible to stir the reaction mixture in conventional equipment is of the order of 15,000 cps. at the reaction temperature employed as discussed below. Advantageously the amount of hydroxyalkylated polyphosphoric acid employed in the reaction mixture (at the reaction temperature employed) is not greater than 8,000 cps.

The lower limit of viscosity of the reaction mixture is not critical and is dictated chiefly by economic reasons. Obviously, in order to reduce operating costs, the amount of hydroxyalkylated polyphosphoric acid employed as reaction medium is held close to the minimum necessary to achieve the desired lowering of viscosity. Any hydroxyalkylated polyphosphoric acid used in excess of this amount results in unnecessary involvement of desirable end product and reduction in the overall amount of polyphosphoric acid which can be alkoxylated in a given time in the available equipment. Thus, the lower limit of viscosity of the reaction mixture for all practical purposes is of the order of about 100 centipoises. While the process of the invention can be carried out at reaction mixture viscosities lower than this limit any advantage to be gained thereby is largely offset by the reasons set forth above.

The proportion of hydroxyalkylated polyphosphoric acid to polyphosphoric acid which it is necessary to employ in order to achieve viscosities within the limits set forth above varies according to the viscosity of each of the components and according to the reaction temperature to be employed. The proportions can readily be determined by a process of trial and error as will be apparent to one skilled in the art. In general the hydroxyalkylated polyphosphoric acid always is present as the major portion of the mixture i.e. the hydroxyalkylated polyphosphoric acid represents more than 50% by weight of the initial reaction mixture. In the majority of instances the amount of hydroxyalkylated polyphosphoric acid employed at reaction medium is the order of about 70% to about 95% by weight of the initial reaction mixture. However, these limits are given for the purposes of guidance only. The most advantageous proportions to be employed in the case of any particular hydroxyalkylated polyphosphoric acid and any particular starting polyphosphoric acid can readily be determined by a process of trial and error.

The admixing of starting polyphosphoric acid and hydroxyalkylated polyphosphoric acid end product can be accomplished readily by agitation in a suitable vessel. The mixture so obtained is then treated with the appropriate alkylene oxide in accordance with procedures well-known in the art. Thus the alkylene oxide can be added in a single batch or can be added continuously or portionwise over a period of time. The alkylene oxide can be added as a liquid, or in the case of the more volatile alkylene oxides, as a gas depending upon the temperature of the reaction mixture.

The reaction is conducted advantageously at elevated temperatures such as from about 60° C. to about 150° C. Preferably the reaction temperature is maintained between about 80° C. and about 130° C.

The theoretical end point in the process of the invention is that corresponding to the uptake of 1 mole of alkylene oxide for each of the free hydroxyl and anhydride moieties originally present in the starting polyphosphoric acid. Thus, in the case of 115% phosphoric acid starting material the theoretical end point of the reaction is that corresponding to the uptake of 4.6 moles of alkylene oxide for each mole of $P_2O_5$ in the starting polyphosphoric acid. It is to be noted however that the above theoretical end-point is not normally achieved in practice.

Thus, if the reaction is allowed to proceed until the uptake of alkylene oxide corresponds to 1 mole for each free hydroxy group and anhydride group in the starting polyphosphoric acid the product obtained comprises a mixture of poly(hydroxyalkoxylated) polyphosphoric acids in which the average degree of alkoxylation is approximately that corresponding to the desired uptake of alkylene oxide. However, the components of the mixture will generally range from those products in which not all the available free hydroxy groups originally present in the phosphoric acid are alkoxylated to those products in which all the original free hydroxy groups of the phosphoric acid have been alkoxylated and, in addition, one or more of the hydroxy groups formed by the alkoxylation has itself been alkoxylated.

The product of reaction generally also contains in addition to the desired poly(hydroxyalkoxylated) polyphosphoric acids, by-products formed, for example, by self condensation of the alkyleneoxide. Such by-products are for the most part, more volatile than the desired poly(hydroxyalkoxylated) polyphosphoric acids and can be removed therefrom by distillation and the like procedures. As will be obvious to one skilled in the art, the formation of such by-products removes alkylene oxide which would otherwise be available for alkoxylation of the polyphosphoric acid. The precise composition of the poly(hydroxyalkoxylated) polyphosphoric acid obtained in the process of the invention will be a function, at least in part, of the amount of by-product formed. This latter is, in turn, affected by the temperature at which the reaction is carried out. The range of temperature at which it is preferred to carry out the process of the invention has been discussed above.

The optimum temperature at which to carry out the reaction in order to minimize the amount of by-products formed varies depending upon the particular polyphosphoric acid and the particular alkylene oxide but can readily be determined by a simple process of trial and error. Similarly, the point at which to halt the uptake of alkylene oxide in any particular instance is one that can be predetermined by suitable trial.

When the desired end point is reached the reaction mixture is treated, for example, by subjecting to stripping under reduced pressure, to remove volatile materials including any unreacted alkylene oxide and certain volatile polymeric products derived from the alkylene oxide. The residual material, remaining after the above treatment, is polyhydroxyalkylated phosphoric acid which generally requires no further treatment prior to use as an intermediate in the synthesis of polyurethanes and the like as described hereinabove.

Part of the material so obtained can then be retained as finished product and the remainder can be employed as reaction medium in the preparation of a subsequent batch of poly(hydroxyalkylated) phosphoric acid. As will be readily apparent to one skilled in the art a convenient method of operation comprises retaining the material to be used as reaction medium in the reaction vessel and merely removing that portion of the batch which is to be retained as finished product. The necessary quantity of polyphosphoric acid starting material is then charged to the residual poly(hydroxyalkylated) phosphoric acid in the reaction vessel, the mixture is alkoxylated as discussed above, a portion of the reaction product is retained in the reaction vessel as before, further fresh polyphosphoric acid starting material is charged to the reaction vessel and the same cycle of operations is repeated as many times as desired.

It is, of course, necessary to prepare an initial batch of poly(hydroxyalkylated) phosphoric acid without the aid of the process of the invention before the latter can be put into operation. This initial batch can be prepared, for example, employing a solvent such as dioxane and using the procedure set forth in U.S. Patent 3,094,549, supra, and using the appropriate proportions of alkylene oxide and phosphoric acid necessary to produce the desired product. The increased cost of preparing the first batch of material, due to the use of the solvent, is rapidly offset by the advantages in cost of materials and ease of operation accruing from the use of the process of the invention.

An alternative manner of preparing the initial batch of poly(hydroxyalkylated) phosphoric acid necessary to initiate the process of the invention involves alkoxylating a polyphosphoric acid such as 105% phosphoric acid which is of a viscosity lower than that which prevents adequate mixing of the reactants. The poly(hydroxyalkoxylated) phosphoric acid so obtained is then used as solvent in the alkoxylation of a pholyphosphoric acid having a calculated $P_2O_5$ content of at least about 78% by weight such as is used in the process of the invention. The alkoxylation product so obtained is then employed as solvent in the alkoxylation of a second batch of a polyphosphoric acid having the calculated $P_2O_5$ content set forth above. This process is repeated as many times as required to produce a poly(hydroxyalkylated) phosphoric acid having the required composition.

The alkylene oxides which can be employed in the process of the invention can be any of those conventionally employed in the alkoxylation of phosphoric acids. Preferred alkylene oxides are those containing from 1 to 6 carbon atoms, inclusive, and the halo derivatives thereof, such as ethylene oxide, propylene oxide, 1,2-butylene oxide, 1,2-hexylene oxide, epichlorohydrin, epibromohydrin, 1-chloro-2,3-epoxybutane, 1-chloro-2,3-epoxyhexane, and the like. If desired, two or more such alkylene oxides can be used in the process of the invention either simultaneously or sequentially.

The process of the invention can be applied to the alkoxylation of the phosphoric acids having a wide range of viscosities. The process is particularly useful in the alkoxylation of polyphosphoric acids having a calculated $P_2O_5$ content of the order of about 78% by weight to about 88% by weight. The process can, of course, be applied to polyphosphoric acids having a $P_2O_5$ content less than the above stated upper limit but such acids have a viscosity sufficiently low to enable them to be alkoxylated without resort to the use of added diluent of any kind. Hence, in such cases the use of the process of the invention is unnecessary.

The process of the invention can be employed in the preparation of poly(hydroxyalkylated) phosphoric acids having a phosphorus content and a ratio of phosphorus content to hydroxy groups markedly higher than those of such products hitherto prepared. The use of polyols having a high ratio of phosphorus content to free hydroxy groups in the molecule is particularly advantageous in the preparation of polyurethanes since the fire retardant properties of the latter are, in general, directly proportional to the phosphorus content thereof. The higher the content of phosphorus in the polyol used to make the polyurethane the higher will be the phosphorus content of the latter, or, alternatively, the lower the amount of said phosphorus containing polyol necessary to produce a polyurethane of a given phosphorus content.

The following examples illustrate the manner and process of making and using the invention and set forth the best mode contemplated by the inventors of carrying out the invention but are not to be construed as limiting.

EXAMPLE 1

Part A.—A poly(hydroxyalkylated) phosphoric acid to be used as reaction medium in a process according to the invention was prepared as follows:

A mixture of 200 g. of 115% phosphoric acid (83.6% $P_2O_5$) and 300 ml. of dioxan was stirred and maintained at a temperature of 40° to 50° C. and a total of approximately 700 g. of propylene oxide was added portionwise at such as rate as to maintain the temperature within the above range. When the addition of propylene oxide was complete the reaction mixture was distilled until the pot temperature reached 80° C. at a pressure of 13 mm. of mercury. The undistilled residue was 751.5 g. of poly(hydroxypropyl) phosphoric acid having an hydroxyl equivalent of 175, an acid number of 0.07 (as determined by titration of a sample with 0.1 N sodium hydroxide in methanol) and a phosphorus content of 9.7%.

Part B.—The material so obtained was then used as reaction medium in a process according to the invention as follows:

A 700 g. portion of the poly(hydroxypropyl) phosphoric acid obtained as described above was heated to 40 to 50° C. and a total of 105 g. of 115% phosphoric acid was added with stirring over a short period of time. The mixing was exothermic (temperature rise approximately 20° C.). After the addition was complete the mixture was stirred for 1 hour at a temperature of 40 to 50° C. At the end of this time the mixture was heated to 92° C. and a total of 380 g. of propylene oxide was added with stirring over a period of 2.5 hours. The temperature was maintained at approximately 92° C. throughout. When the addition was complete the acid number was found to be 0.2. The mixture so obtained was distilled under a pressure of 2 mm. of mercury until the pot temperature reached 100° C. thereby removing relatively volatile components. There was thus obtained, as the undistilled residue, 1081 g. of poly(hydroxypropyl) phosphoric acid as a viscous liquid having a viscosity of 75 poise at 23° C. equivalent weight 190 and percent phosphorus of 9.75. This represented a weight yield (i.e. weight of "new" product expressed as a percentage of the combined weights of phosphoric acid and propylene oxide starting materials) of 78.5%.

EXAMPLE 2

A series of successive batches of poly(hydroxypropyl) phosphoric acid were prepared in the following manner.

The poly(hydroxypropyl) phosphoric acid employed as reaction medium was prepared using the procedure described in Example 1, Part A, and had an equivalent weight of 189.3, phosphorus content of 8.71% and visrosity of 88.8 poise at 23° C.

A mixture of 700 g. of the above material and 105 g. of 115% phosphoric acid was prepared and treated at 60° C. with a total of 450 g. of propylene oxide using the procedure described in Example 1, Part B. After completion of the reaction and removal of volatile material as described in the latter example, a portion of the product was removed from the reaction vessel leaving 700 g. of the product in the reaction vessel to be used as solvent in the propoxylation of a second batch of phosphoric acid. This procedure was repeated for a total of 9 batches of material. The quantities of reactants, reaction temperatures and analytical data for the products are shown in table below. The percentage yield represents the amount of "new" product (i.e. generated from phosphoric acid in the batch in question) obtained expressed as a percentage of the total weight of phosphoric acid and propylene oxide employed in making the batch. The ratio "New/Old" shows the proportion, in parts by weight, of the amount of "new" product (as defined above) and the amount of "old" product i.e. product obtained in the previous batch and employed as solvent in the batch in question.

TABLE

| Run No. | Propylene oxide, grams | 115% H₃PO₄, grams | Reaction temperature (° C.) | Average, Percent P | OH eq. wt. | Visc. poise at 23° C. | New partial Percent P | Percent yield | Product ratio new/old |
|---|---|---|---|---|---|---|---|---|---|
| 0 |  |  |  | 8.71 | 189.3 | 88.8 |  |  |  |
| 1 | 450 | 105 | 60 | 8.53 | 190.3 | 106 | 8.30 | 82.8 | 459/700 |
| 2 | 400 | 108 | 60 | 8.57 | 202.1 | 97.2 | 8.61 | 89.4 | 455/700 |
| 3 | 450 | 105 | 60 | 8.60 | 199.1 | 74.8 | 8.65 | 79.5 | 441/700 |
| 4 | 360 | 105 | 92 | 9.05 | 199.7 | 115 | 9.85 | 83.0 | 386/700 |
| 5 | 370 | 105 | 92 | 9.42 | 207.4 | 156 | 10.1 | 79.5 | 378/701 |
| 6 | 390 | 105.5 | 92 | 9.38 | 207 | 145 | 9.30 | 83.2 | 413/701 |
| 7 | 400 | 105 | 130 | 9.93 | 225.5 | 123 | 11.0 | 68.9 | 347/700 |
| 8 | 460 | 114 | 130 | 10.2 | 228.7 | 139 | 10.7 | 67.5 | 387/760 |
| 9 | 730 | 115 | 150 | 10.5 | 237.3 | 110 | 11.15 | 44.5 | 375/760 |

EXAMPLE 3

Using the procedure described in Example 1, Part A, but replacing propylene oxide by the equivalent amount of ethylene oxide there is obtained the corresponding poly(hydroxyethyl) phosphoric acid. The latter is then used as reaction medium in the ethoxylation of 115% phosphoric acid using the procedure described in Example 1, Part B.

Similarly, polyphopshoric acids having a P₂O₅ content from about 78% to about 88% are alkoxylated by employing as reaction medium a polyalkoxylated phosphoric acid prepared from the appropriate phosphoric acids and alkylene oxides using the procedure described in Example 1, Part A. Alkylene oxides which are used in this manner include epichlorohydrin, 1,2-butylene oxide, 1,2-hexylene oxide, epibromohydrin, and the like.

We claim:

1. In a process for the preparation of a poly(hydroxyalkyl) polyphosphate by reaction of an alkylene oxide with a phosphoric acid having a calculated $P_2O_5$ content of at least about 78% by weight, the improvement which comprises admixing said phosphoric acid with a major portion of the poly(hydroxyalkyl) polyphosphate end-product obtained in a previous batch of said end-product and reacting the mixture so obtained with the appropriate alkylene oxide.

2. The process of claim 1 wherein the phosphoric acid starting material has a $P_2O_5$ content from about 78% by weight to about 88% by weight.

3. The process of claim 1 wherein the reaction is carried out at a temperature of from about 60° C. to about 150° C.

4. The process of claim 1 wherein the amount of poly(hydroxyalkyl) polyphosphate employed as reaction medium is within the range of about 70% to about 95% by weight of the initial reaction mixture.

5. In a process for the preparation of a poly(hydroxypropyl) polyphosphate by reaction of propylene oxide with a phosphoric acid having a calculated $P_2O_5$ content of at least about 78% by weight, the improvement which comprises admixing said phosphoric acid with a major portion of the poly(hydroxypropyl) polyphosphate end-product obtained in a previous batch of said end-product and reacting the mixture so obtained with propylene oxide.

6. The process of claim 1 wherein the phosphoric acid starting material has a $P_2O_5$ content from about 75% by weight to about 88% by weight.

7. The process of claim 1 wherein the phosphoric acid starting material is 115% phosphoric acid.

8. The process of claim 6 wherein the reaction is carried out at a temperature from about 60° C. to about 150° C.

9. The process of claim 6 wherein the amount of poly(hydroxyalkyl) polyphosphate employed as reaction medium is within the range of about 70% to about 95% by weight of the initial reaction mixture.

10. A semicontinuous process for the reaction of an alkylene oxide with a phosphoric acid having a calculated $P_2O_5$ content of at least about 78% by weight which comprises admixing said phosphoric acid with a major portion of the poly(hydroxyalkyl) polyphosphate end-product obtained in a previous batch of said end-product, reacting the mixture so obtained with the alkylene oxide to convert said phosphoric acid to the desired poly(hydroxyalkyl) polyphosphate, and employing a portion of the poly(hydroxyalkyl) polyphosphate so obtained as reaction medium in the reaction of a subsequent batch of said phosphoric acid with the alkylene oxide.

11. The process of claim 10 wherein the alkylene oxide is propylene oxide.

12. The process of claim 10 wherein the phosphoric acid has a calculated $P_2O_5$ content of from about 78% by weight to about 88% by weight.

13. The process of claim 10 wherein the phosphoric acid is 115% phosphoric acid.

References Cited

UNITED STATES PATENTS

| 3,317,639 | 5/1967 | Hartman | 260—978 |
| 3,318,982 | 5/1967 | Klose et al. | 260—980 |
| 3,331,896 | 7/1967 | Eiseman et al. | 260—980 |

CHARLES B. PARKER, *Primary Examiner.*

R. L. RAYMOND, *Assistant Examiner.*

U.S. Cl. X.R.

260—980